No. 683,063. Patented Sept. 24, 1901.
W. O'BRIEN, Jr.
MEANS FOR CONVEYING POWER TO DREDGES.
(Application filed Dec. 6, 1900.)
(No Model.)
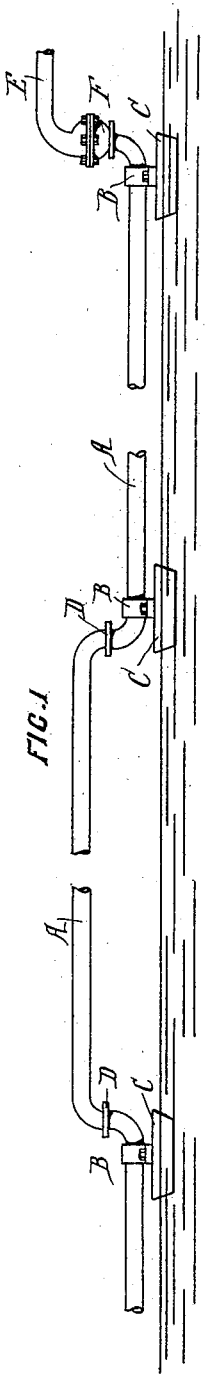
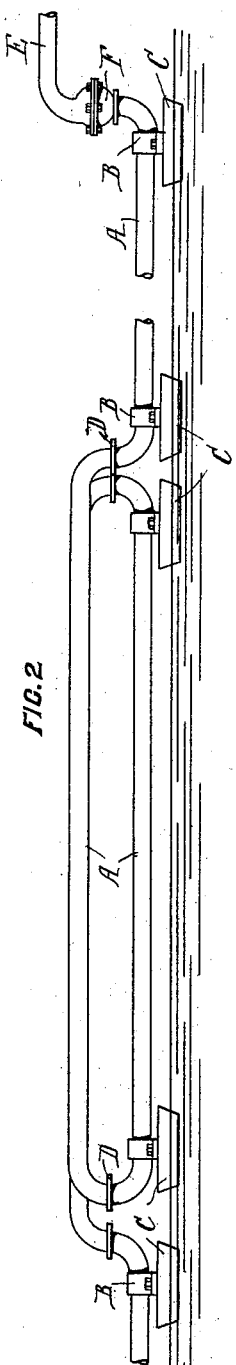
WITNESSES:
INVENTOR
ATTORNEYS

United States Patent Office.

WILLIAM O'BRIEN, JR., OF WAIPORI, NEW ZEALAND.

MEANS FOR CONVEYING POWER TO DREDGES.

SPECIFICATION forming part of Letters Patent No. 683,063, dated September 24, 1901.

Application filed December 6, 1900. Serial No. 38,929. (No model.)

*To all whom it may concern:*

Be it known that I, WILLIAM O'BRIEN, Jr., a subject of the Queen of Great Britain, residing at Waipori, Otago, in the Colony of New Zealand, have invented a new and useful Means for Conveying Hydraulic Power to Gold-Dredges or other Floating Vessels; and I do hereby declare the following to be a full, clear, and exact description of the same.
This invention has been devised for the purpose of providing means whereby hydraulic power from any suitable source of supply may be conveyed from the shore to dredges for the purpose of driving the different machinery upon the dredges.

The invention comprises pipe lengths pivoted together to fold in a horizontal plane and floats for sustaining said pipes, said pipe lengths being in different horizontal planes and having upwardly and downwardly extending ends to form the pivotal connection.

The pipes are made of such a length relatively to one another that when the dredge is working close to the shore they may be folded up with their union-joints as hinges, and the pontoons or floats shall lie within a small compass. As the dredge moves away from the shore the pipes will unfold themselves and form a continuous length.
In the accompanying drawings, Figure 1 is a side elevation of the system of pipes extended. Fig. 2 is a side elevation of the system of pipes folded up as they will be when the dredge is working near the shore.
A A are the lengths of pipe, which are secured at intervals by means of the straps B or in any other suitable manner to the small floats or pontoons C. The lengths of piping A are connected together by union-joints D, which serve as hinges for allowing the pipes to be moved independently of each other in a horizontal plane upon the surface of the water. The length of pipe A nearest the shore is connected to a pipe E, leading from any suitable source of water-supply, by means of the universal joint F. This universal joint will permit of the system of pipes rising or falling with any alteration in the level of the water in which the dredge is working. The water under pressure is led from the source of supply through the pipe E to the system of pipes A, through which it will pass and be delivered onto the dredge, where it may be employed for operating any suitable hydraulic motor. When the dredge is working near the shore, the system of pipes A will be folded up upon their joints D as hinges and will lie alongside each other, as shown in the drawings, Fig. 2; but as the dredge moves away from the shore the pipes will be opened out until at its limit of movement they will form one continuous length. The water after it has been used for driving the motor may be used for washing the wash-dirt in gold-dredges or for any other suitable purpose.

In the drawings the lengths of piping are shown secured at their ends to the floats or pontoons. In cases where the piping is composed of great lengths the pipes would be supported on floats at their centers or they would be strengthened by bracing.

What I claim as my invention, and desire to secure by Letters Patent, is—

In combination, the pipe lengths pivoted together to fold in a horizontal plane, and the floats for sustaining said pipes, said pipe lengths being in different horizontal planes and having upwardly and downwardly extending ends to form the pivotal connection, substantially as described.

In testimony whereof I have signed this specification, this 25th day of October, 1900, in the presence of two subscribing witnesses.

WILLIAM O'BRIEN, JUR.

Witnesses:
J. WHITE,
N. O. WHITE.